(12) United States Patent
Jeyakumar et al.

(10) Patent No.: US 12,676,886 B2
(45) Date of Patent: Jul. 7, 2026

(54) AUTOMATIC SECURITY MESSAGE INTERACTION

(71) Applicant: Abnormal AI, Inc., Las Vegas, NV (US)

(72) Inventors: Sanjay Jeyakumar, El Cerrito, CA (US); Abhijit Bagri, Atlanta, GA (US); David Hagar, London (GB); Yicheng Wang, San Francisco, CA (US); Shrivastava Shankar, San Francisco, CA (US); Shoaib Ahmed, Bengaluru (IN); De Sheng Chuan, Singapore (SG)

(73) Assignee: Abnormal AI, Inc., Las Vegas, NV (US)

( * ) Notice: Subject to any disclaimer, the term of this patent is extended or adjusted under 35 U.S.C. 154(b) by 0 days.

(21) Appl. No.: 18/758,598

(22) Filed: Jun. 28, 2024

(65) Prior Publication Data

US 2026/0006075 A1     Jan. 1, 2026

(51) Int. Cl.
| | |
|---|---|
| *G06F 21/00* | (2013.01) |
| *G06F 40/35* | (2020.01) |
| *H04L 9/40* | (2022.01) |

(52) U.S. Cl.
CPC .......... *H04L 63/1483* (2013.01); *G06F 40/35* (2020.01); *H04L 63/1425* (2013.01)

(58) Field of Classification Search
CPC .. H04L 63/1483; H04L 63/1425; G06F 40/35
See application file for complete search history.

(56) References Cited

U.S. PATENT DOCUMENTS

| | | | | |
|---|---|---|---|---|
| 2020/0344251 | A1* | 10/2020 | Jeyakumar | ............ H04L 51/212 |
| 2021/0266345 | A1* | 8/2021 | Chen | ................... H04L 63/1425 |
| 2022/0094713 | A1* | 3/2022 | Lee | ........................ G06F 18/214 |
| 2024/0412001 | A1* | 12/2024 | Agarwal | ............... G06F 40/253 |
| 2024/0414211 | A1* | 12/2024 | Boyer | ..................... G06F 40/58 |
| 2025/0240313 | A1* | 7/2025 | Zhang | ..................... H04L 41/16 |

* cited by examiner

*Primary Examiner* — Michael M Lee

(74) *Attorney, Agent, or Firm* — Van Pelt, Yi & James LLP

(57) ABSTRACT

In various embodiments, a process for providing automatic security message interaction includes receiving an indication of a suspicious message, and using one or more threat analysis machine learning models to analyze the suspicious message to determine a threat analysis result of the suspicious message. The process includes automatically generating a prompt for a machine learning large-language model to generate a responsive message communicating about the suspicious message, wherein the prompt is based at least in part on a result of the threat analysis result, security policies of an entity, and a communication preference of the entity. The process includes providing the generated responsive message to a recipient of the suspicious message.

19 Claims, 16 Drawing Sheets

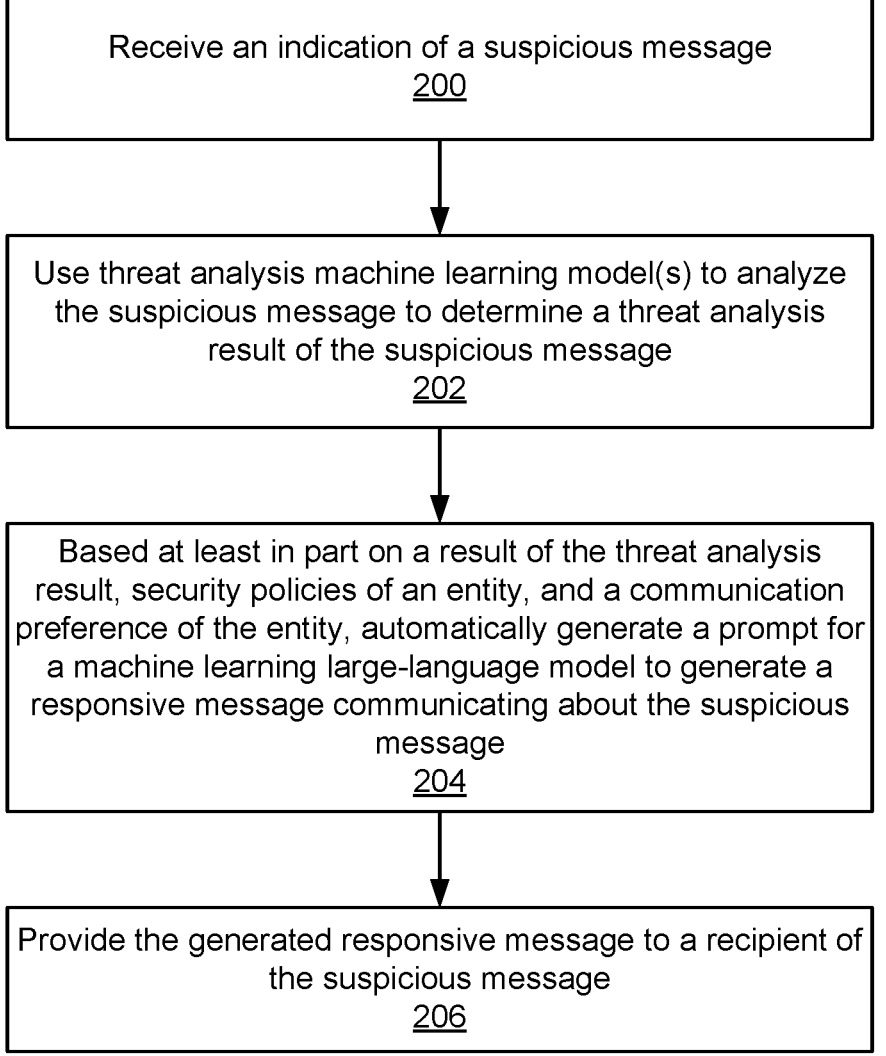

Receive an indication of a suspicious message
200

Use threat analysis machine learning model(s) to analyze the suspicious message to determine a threat analysis result of the suspicious message
202

Based at least in part on a result of the threat analysis result, security policies of an entity, and a communication preference of the entity, automatically generate a prompt for a machine learning large-language model to generate a responsive message communicating about the suspicious message
204

Provide the generated responsive message to a recipient of the suspicious message
206

FIG. 2

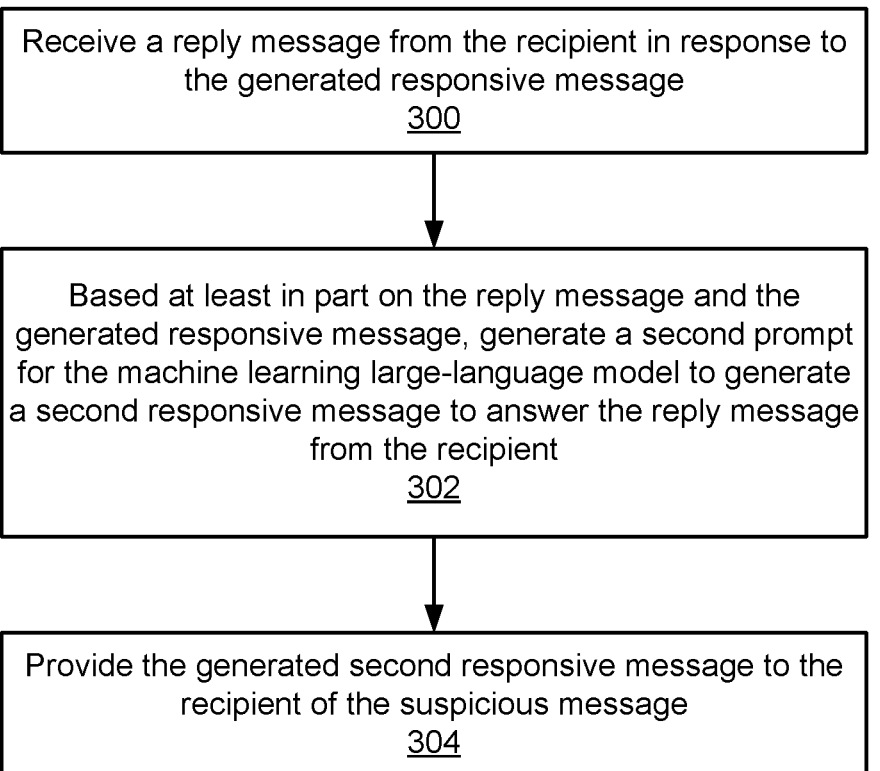

Receive a reply message from the recipient in response to the generated responsive message
300

Based at least in part on the reply message and the generated responsive message, generate a second prompt for the machine learning large-language model to generate a second responsive message to answer the reply message from the recipient
302

Provide the generated second responsive message to the recipient of the suspicious message
304

FIG. 3

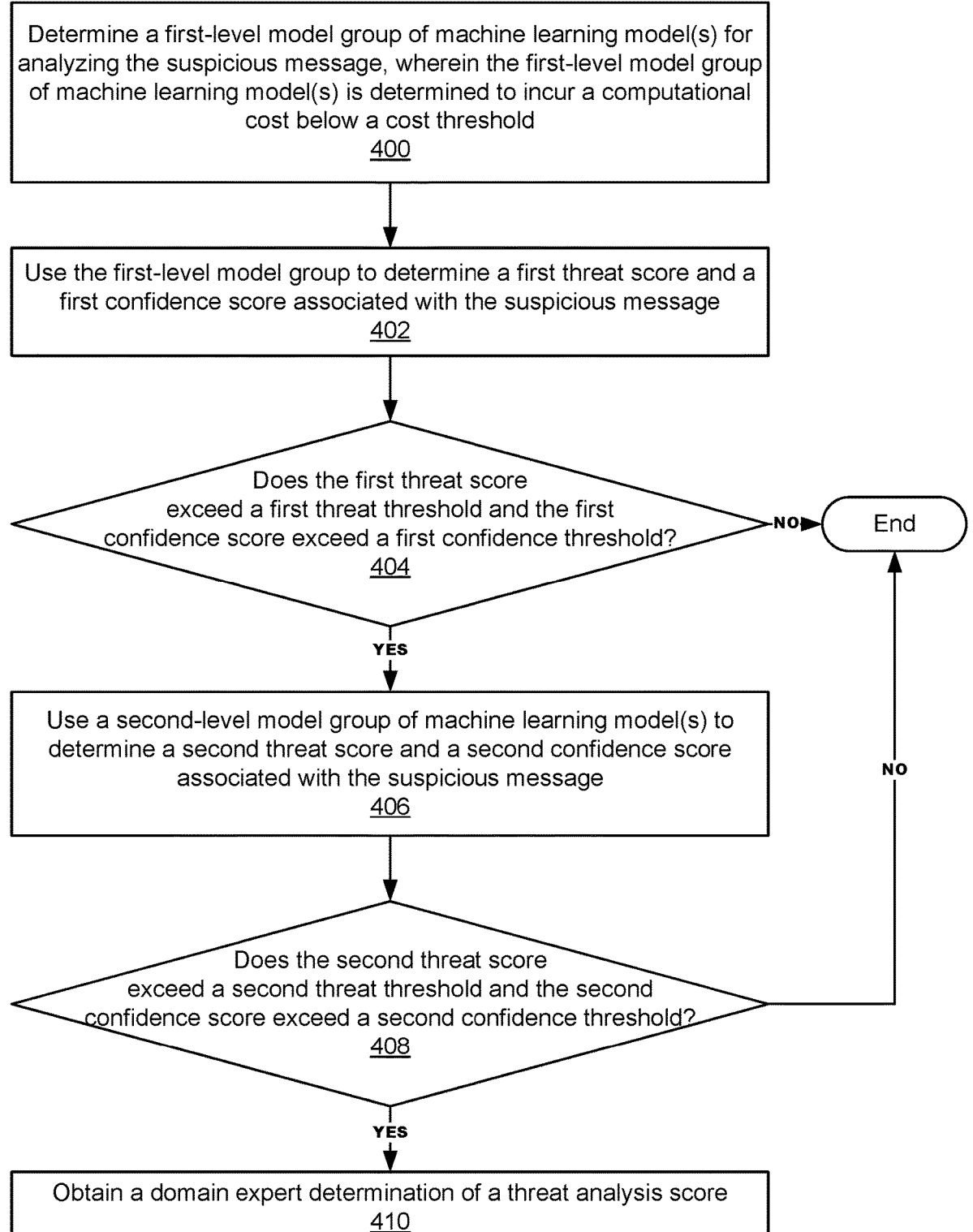

Determine a first-level model group of machine learning model(s) for analyzing the suspicious message, wherein the first-level model group of machine learning model(s) is determined to incur a computational cost below a cost threshold
400

Use the first-level model group to determine a first threat score and a first confidence score associated with the suspicious message
402

Does the first threat score exceed a first threat threshold and the first confidence score exceed a first confidence threshold?
404

NO ▶ End

YES

Use a second-level model group of machine learning model(s) to determine a second threat score and a second confidence score associated with the suspicious message
406

Does the second threat score exceed a second threat threshold and the second confidence score exceed a second confidence threshold?
408

NO

YES

Obtain a domain expert determination of a threat analysis score
410

FIG. 4

⊠ Your phishing report has been reviewed

AI Security Analyst <abnormalai@abnormalsecurity.com> ☺ ↰ Reply ↰ Reply all ↱ Forward |▣∨ ♠∨ ◈|▣|⋯
 Fri 4/19/2024 4:15 PM
To: Gabriel Rebane Hey Gabriel, I hope you're having a great day! I wanted to let you know that we received your report about the email from Mike Britton regarding the exciting new AI auto-responder feature. Thanks for keeping an eye out for any suspicious emails!

Now, I can understand why you might have thought this email was a bit fishy. After all, it's always important to be cautious when it comes to new features and updates. But fear not, my friend, our AI-powered security platform has thoroughly analyzed this email and deemed it safe.

First of all, our system recognized that the email came from a known sender, Mike Britton, who is the Chief Information Security Officer at Abnormal Security. So, it's definitely someone we trust. Additionally, the email came from a known domain, abnormalsecurity.com

Abnormal

Go ahead, be human.
Abnormal AI keeps Your email protected.

[ Learn More → ]

Cloud Email Security - Block Malicious Email Attacks

Advanced email protection to prevent credential phishing, business email compromise, account takeover, and more.

abnormalsecurity.com

, which has been registered for quite some time now.

Furthermore, the email's authentication signatures passed with flying colors, giving us even more confidence in its legitimacy. And let's not forget that the content of the email itself is all about a new feature being launched by our very own Abuse Mailbox team. It's all in-house stuff, so no need to worry about any external threats.

So, Gabriel, rest assured that this email is safe and sound. But hey, we always appreciate your vigilance and encourage you to keep reporting any suspicious emails you come across. Your feedback is invaluable in helping us fine-tune our security measures.

If you have any more questions or concerns, feel free to reach out. Stay safe out there!

Best regards,
Abnormal AI

Figure 6:
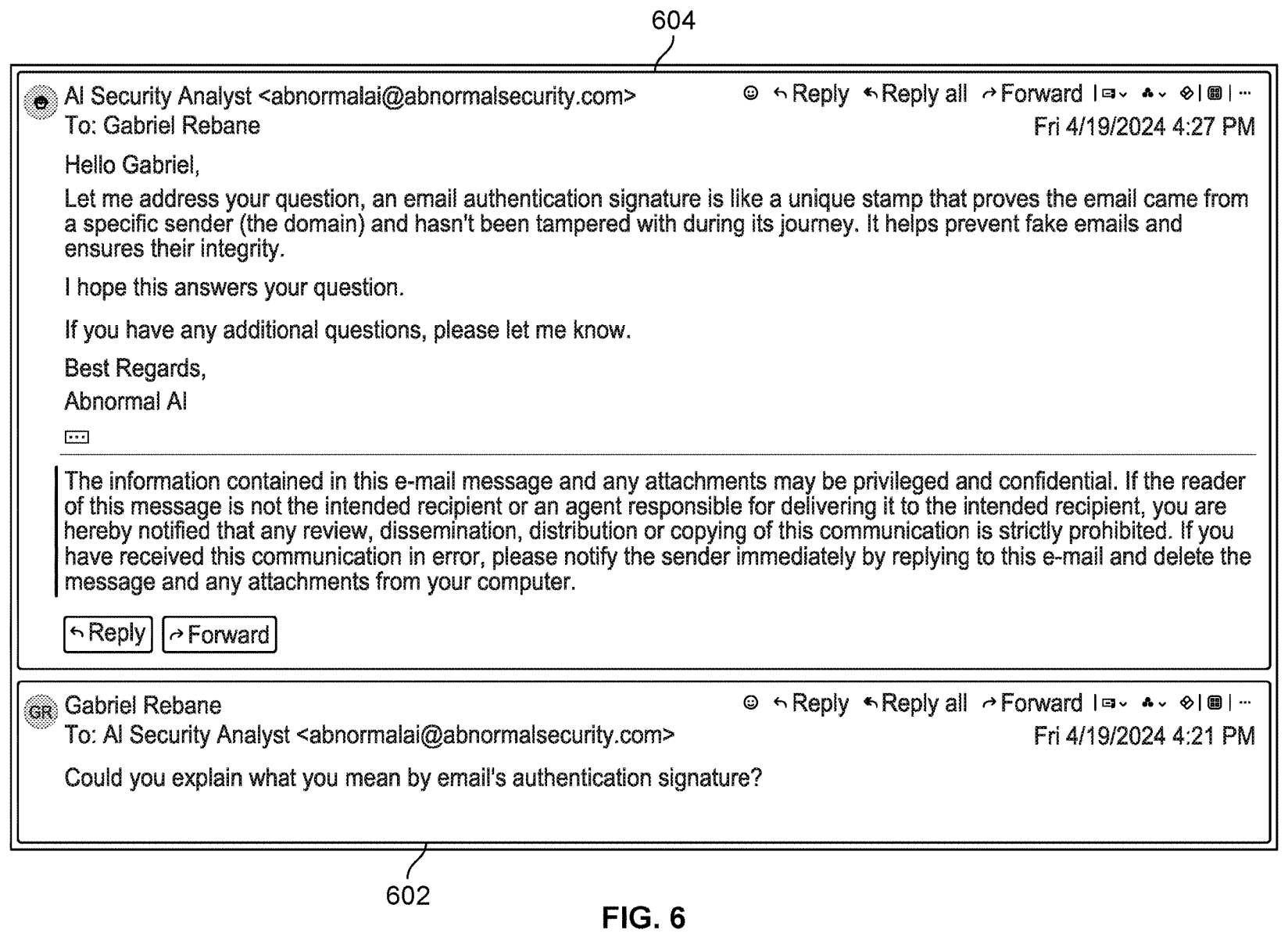

⊖ ↶Reply ↞Reply all ↗Forward |▣ˇ ♣ˇ ◈|▦|···

AI Security Analyst <abnormalai@abnormalsecurity.com>
To: Gabriel Rebane
Fri 4/19/2024 4:27 PM Hello Gabriel, Let me address your question, an email authentication signature is like a unique stamp that proves the email came from a specific sender (the domain) and hasn't been tampered with during its journey. It helps prevent fake emails and ensures their integrity.

I hope this answers your question.

If you have any additional questions, please let me know.

Best Regards,
Abnormal AI

···

The information contained in this e-mail message and any attachments may be privileged and confidential. If the reader of this message is not the intended recipient or an agent responsible for delivering it to the intended recipient, you are hereby notified that any review, dissemination, distribution or copying of this communication is strictly prohibited. If you have received this communication in error, please notify the sender immediately by replying to this e-mail and delete the message and any attachments from your computer.

↶Reply | ↗Forward

⊖ ↶Reply ↞Reply all ↗Forward |▣ˇ ♣ˇ ◈|▦|···

GR Gabriel Rebane
To: AI Security Analyst <abnormalai@abnormalsecurity.com>
Fri 4/19/2024 4:21 PM Could you explain what you mean by email's authentication signature?

Analyzed Submissions  Not Analyzed ⊙

Submissions are grouped into campaigns in the table below.

Filter By ⊕                                                                                                Viewing 13 campaigns

| Subject | Last Reporter | From | Recipient(s) ⊙ | Received | Last Reported : | Judgement | Overall Status |
|---|---|---|---|---|---|---|---|
| Payment Update - Dropbox | Jonathan Green jonathan.green@enterprise.com | Stacy Monaghan stacy.monaghan@dropbox.com | Jonathan Green jonathan.green@enterprise.com | A Year Ago Nov 23, 2022, 3:44pm CST | 8 Months Ago Jul 9, 2023, 9:18pm CDT | SAFE | NO ACTION NEEDED |
| Secure Messaging Password Notification | Sean Young sean.young@enterprise.com | Onpoint Postmaster postmaster@onpointcu.com | Sean Young sean.young@enterprise.com | A Year Ago Nov 19, 2022, 10:11pm CST | 8 Months Ago Jul 3, 2023, 9:18pm CDT | SAFE | NO ACTION NEEDED |
| REQUEST ◀ Attack Type: Phishing: Credential | Renee West renee.west@enterprise.com | Barbara Larue blarue@metexcorp.com  ⓑ Impersonated Party: Unknown Partner | Renee West renee.west@enterprise.com | A Year Ago Oct 31, 2022, 3:43pm CDT | 8 Months Ago Jun 23, 2023, 9:18pm CDT | MALICIOUS | AUTO-REMEDIATED |
| Your building is under my control | Luke Watson luke.watson@enterprise.com | Mcdermott Wiese afqxvkqhe@vaydeptrungnien.vn  ◁ Impersonated Party: Others | 4 Recipients | A Year Ago Oct 27,2022, 1:33am CDT | 8 Months Ago Jun 22, 2023, 9:18pm CDT | MALICIOUS | AUTO-REMEDIATED |
| Your Workplace account login details. | Sean Young sean.young@enterprise.com | Enterprise Via Workplace notification@fb-workmail.com | Sean Young sean.young@enterprise.com | 2 Years Ago Dec 21, 2021, 8:43am CST | 9 Months Ago Jun 9, 2023, 9:18pm CDT | SAFE | NO ACTION NEEDED |
| RE: Urgent - Billing Statement is available - | | Office Online Service | | | | | |

FIG. 7 (Cont.)

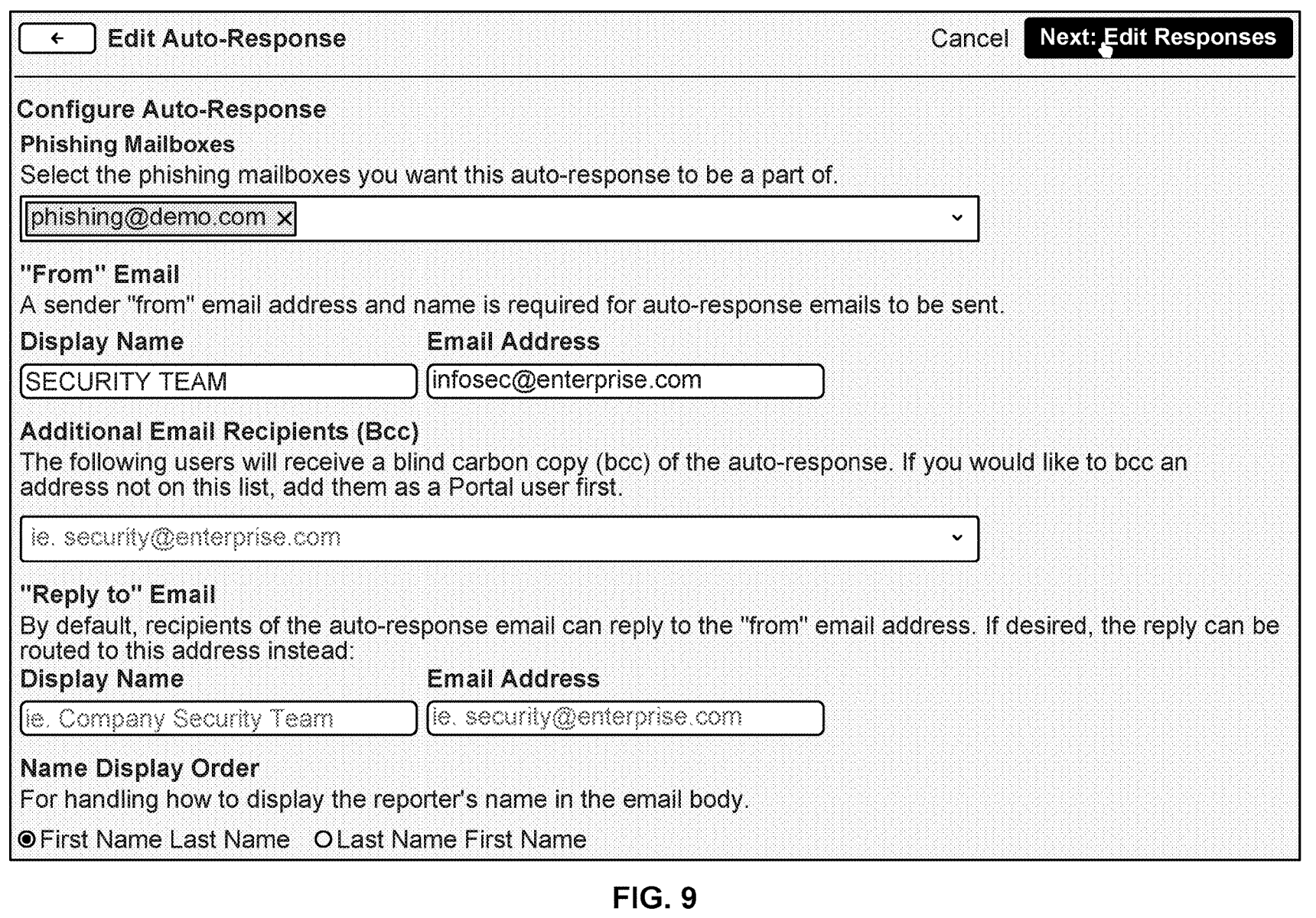

Cancel Next: Edit Responses

Edit Auto-Response

Configure Auto-Response

Phishing Mailboxes

Select the phishing mailboxes you want this auto-response to be a part of.

phishing@demo.com X

"From" Email

A sender "from" email address and name is required for auto-response emails to be sent.

Display Name Email Address

SECURITY TEAM infosec@enterprise.com

Additional Email Recipients (Bcc)

The following users will receive a blind carbon copy (bcc) of the auto-response. If you would like to bcc an address not on this list, add them as a Portal user first.

ie. security@enterprise.com

"Reply to" Email

By default, recipients of the auto-response email can reply to the "from" email address. If desired, the reply can be routed to this address instead:

Display Name Email Address ie. Company Security Team ie. security@enterprise.com

Name Display Order

For handling how to display the reporter's name in the email body.

⦿ First Name Last Name ◯ Last Name First Name

FIG. 9

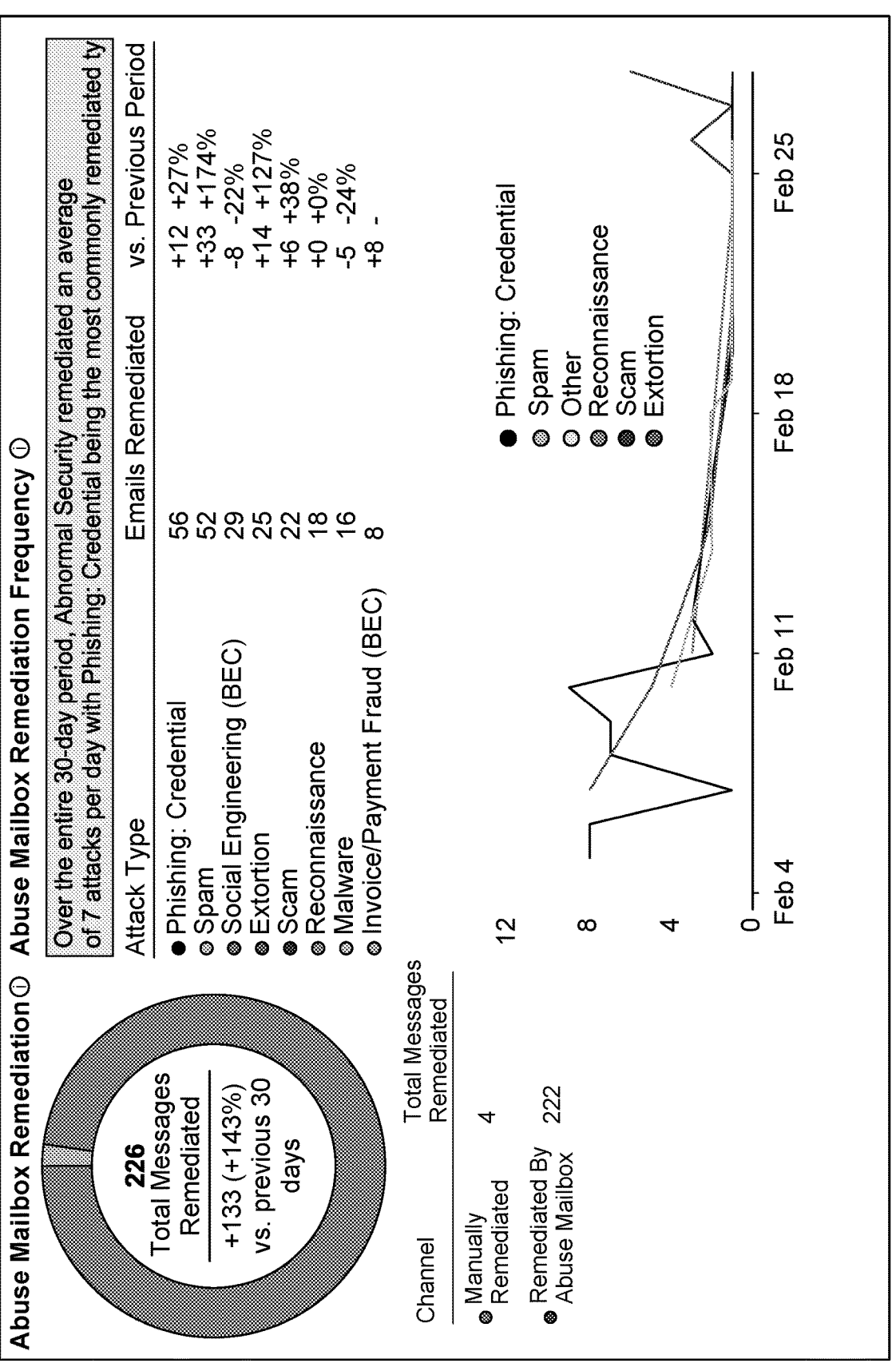

Abuse Mailbox Remediation ⊙  Abuse Mailbox Remediation Frequency ⊙

Over the entire 30-day period, Abnormal Security remediated an average of 7 attacks per day with Phishing: Credential being the most commonly remediated ty

| Attack Type | Emails Remediated | vs. Previous Period |
|---|---|---|
| ● Phishing: Credential | 56 | +12 +27% |
| ⊛ Spam | 52 | +33 +174% |
| ◉ Social Engineering (BEC) | 29 | -8 -22% |
| ⊛ Extortion | 25 | +14 +127% |
| ● Scam | 22 | +6 +38% |
| ⊛ Reconnaissance | 18 | +0 +0% |
| ◉ Malware | 16 | -5 -24% |
| ◉ Invoice/Payment Fraud (BEC) | 8 | +8 - |

226
Total Messages Remediated
+133 (+143%) vs. previous 30 days

| Channel | Total Messages Remediated |
|---|---|
| ⊛ Manually Remediated | 4 |
| ● Remediated By Abuse Mailbox | 222 |

● Phishing: Credential
⊛ Spam
○ Other
⊛ Reconnaissance
● Scam
◉ Extortion

12

8

4

0

Feb 4    Feb 11    Feb 18    Feb 25

FIG. 13

AUTOMATIC SECURITY MESSAGE INTERACTION

BACKGROUND OF THE INVENTION

Currently, security teams such as security operations center ("SOC") analysts are often overburdened by the tedious process of managing the user-reported email work-flow. For example, when a user receives a suspicious email, they may report it as such by emailing an SOC analyst, creating a ticket, or the like. The SOC analyst typically needs to manually triage, remediate, and respond to each email, which is inefficient and may be prone to increasing error especially as the SOC analyst becomes fatigued.

BRIEF DESCRIPTION OF THE DRA WINGS

Various embodiments of the invention are disclosed in the following detailed description and the accompanying drawings.

FIG. 2 is a flow diagram illustrating an embodiment of a process for automatic security message interaction.

FIG. 3 is a flow diagram illustrating an embodiment of a process for automatic security message interaction including generating a responsive message to a reply message.

FIG. 4 is a flow diagram illustrating an embodiment of a process for automatic security message interaction including using a threat analysis machine learning model to analyze a suspicious message.

FIG. 5 shows an example of a graphical user interface for automatic security message interaction including a respon-sive message obtained in some embodiments.

FIG. 6 shows an example of a graphical user interface for automatic security message interaction including a reply message and a second responsive message obtained in some embodiments.

FIG. 9 shows an example of a graphical user interface for configuring automatic security message interaction for a particular security mailbox obtained in some embodiments.

FIG. 13 shows an example of a graphical user interface for a dashboard for a security threat detection platform including automatic security message interaction function-ality.

DETAILED DESCRIPTION

Figure 1:
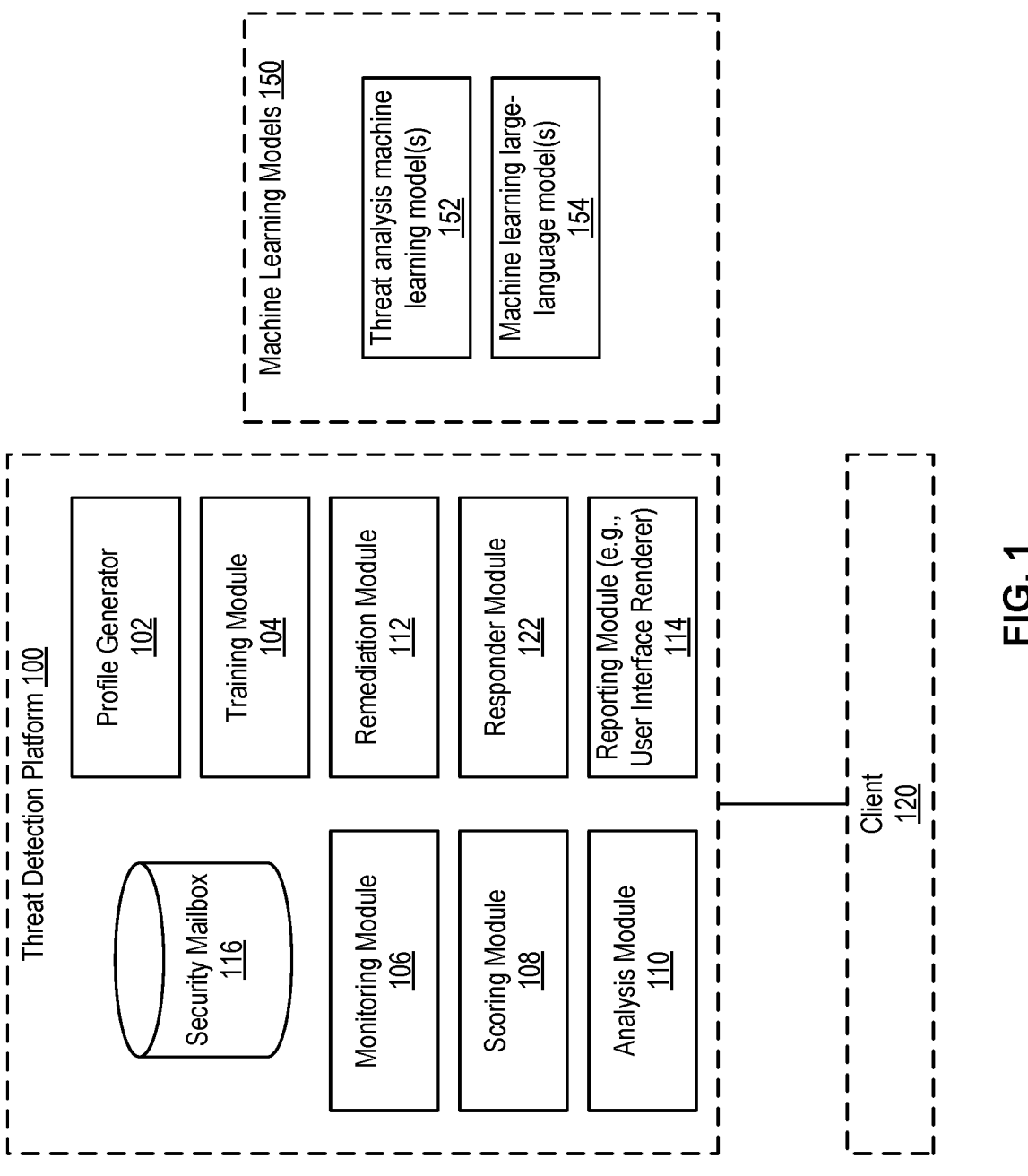
FIG. 1 is a block diagram illustrating an embodiment of a system for security threat detection including automatic security message interaction.

The invention can be implemented in numerous ways, including as a process; an apparatus; a system; a composi-tion of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as tech-niques. In general, the order of the steps of disclosed processes may be altered within the scope of the invention. Unless stated otherwise, a component such as a processor or a memory described as being configured to perform a task may be implemented as a general component that is tem-porarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying fig-ures that illustrate the principles of the invention. The invention is described in connection with such embodi-ments, but the invention is not limited to any embodiment. The scope of the invention is limited only by the claims and the invention encompasses numerous alternatives, modifi-cations and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The disclosed techniques provide automatic security mes-sage interaction. In various embodiments, one or more security mailboxes are automatically monitored, and an automatic responder (sometimes called a conversationalist, an artificial intelligence conversationalist, or an autore-sponder) autonomously inspects and determines whether a suspicious message (e.g., user-reported emails) represents a security risk such as being malicious, spam, part of a phishing campaign, among others.

The automatic responder may converse with a user asso-ciated with (e.g., who reported) a suspicious message. For example, a reported/reporting message may be replied to with an automatically generated message that includes explanations, which may be detailed and/or include a sum-mary that is human-comprehensible. The interaction may be based on automatic determinations of the reasons for why a message is safe or malicious to the user. Consequently, the user may be trained to better recognize malicious messages. The conversation may be ongoing, meaning users may ask follow-up or other security-related questions and receive further automatically generated responses.

The automatic responder may be provided in the context of the security platform. For example, a dashboard associ-ated with the security platform enables an administrator to configure aspects of the automatic responder. The contents of a security mailbox (where suspicious messages are col-lected) may be displayed along with visibility into various submissions. For example, the interaction may be configured to implement the preferences or policies of an organization. If a message is determined to be a security risk, remediation actions may be taken. For example, messages that are part of the same phishing campaign may be located and removed.

FIG. 1 is a block diagram illustrating an embodiment of a system for security threat detection including automatic security message interaction. In various embodiments, the system for security threat detection includes automatic security message interaction.

In various embodiments, this system is a threat detection platform that examines the digital conduct of accounts associated with users such as employees to detect security threats such as the security of an enterprise or of the user and the user's associates. As shown here, the threat detection platform 100 may include a profile generator 102, a training module 104, a monitoring module 106, a scoring module 108, an analysis module 110, a remediation module 112, a responder module 122, and a user interface renderer module 114 (sometimes called a reporting module). Although shown as external to the security threat platform, machine learning models 150, which include one or more threat analysis machine learning models 152 and one or more machine learning large-language models 154, may be included in the platform. Some embodiments of the threat detection platform 100 include a subset of these components, while other embodiments of the threat detection platform 100 include additional components that are not shown in FIG. 1.

At a high level, the threat detection platform 100 can acquire data related to digital conduct of accounts associated with users and then determine, based on an analysis of the data, how to handle security threats in a targeted manner. Some data may be acquired from an enterprise network, while other data may be acquired from a developer of a platform, for example, via an application programming interface ("API"). As shown in FIG. 1, the data may include information related to emails, messages, mail filters, sign-in activities, access activities, and the like. As further discussed below, these data are not necessarily obtained from the same source. As an example, data related to emails may be acquired from an email service (e.g., Microsoft Exchange™) while data related to messages may be acquired from a messaging service (e.g., Slack®).

The threat detection platform 100 can be implemented, partially or entirely, within an enterprise network, a remote computing environment (e.g., through which the data regarding digital conduct is routed for analysis), a gateway, or another suitable location. The remote computing environment can belong to, or be managed by, the enterprise or another entity. In some embodiments, the threat detection platform 100 is integrated into the enterprise's email system (e.g., at the gateway) as part of an inline deployment. In other embodiments, the threat detection platform 100 is integrated into the enterprise's email system via an API such as the Microsoft Outlook® API. In such embodiments, the threat detection platform 100 may obtain data via the API. Thus, the threat detection platform 100 can supplement and/or supplant other security products employed by the enterprise.

In a first variation, the threat detection platform 100 is maintained by a threat service (also referred to as a "security service") that has access to multiple enterprises' data. In this variation, the threat detection platform 100 can route data that is, for example, related to incoming emails to a computing environment managed by the security service. The computing environment may be an instance on Amazon Web Services®. The threat detection platform 100 may maintain one or more databases for each enterprise that include, for example, organizational charts, attribute baselines, communication patterns, and the like. Additionally or alternatively, the threat detection platform 100 may maintain federated databases that are shared amongst multiple entities. Examples of federated databases include databases specifying vendors and/or individuals who have been deemed fraudulent, domains from which incoming emails determined to be malicious originated, and the like. The security service may maintain different instances of the threat detection platform 100 for different enterprises, or the security service may maintain a single instance of the threat detection platform 100 for multiple enterprises. The data hosted in these instances can be obfuscated, encrypted, hashed, depersonalized (e.g., by removing personal identifying information), or otherwise secured or secreted. Accordingly, each instance of the threat detection platform 100 may only be able to access and then process data related to the accounts associated with the corresponding enterprise(s).

In a second variation, the threat detection platform 100 is maintained by the enterprise whose accounts are being monitored-either remotely or on premises. In this variation, all relevant data may be hosted by the enterprise itself, and any information to be shared across multiple enterprises can be transmitted to a computing system that is maintained by the security service or a third party.

As shown in FIG. 1, the profile generator 102, the training module 104, monitoring module 106, scoring module 108, analysis module 110, remediation module 112, reporting module 114, and responder module 122 can be integral parts of the threat detection platform 100. Alternatively, these components could be implemented individually while operating "alongside" the threat detection platform 100. For example, the reporting module 114 may be implemented in a remote computing environment to which the threat detection platform 100 is communicatively connected across a network. As mentioned above, the threat detection platform 100 may be implemented by a security service on behalf of an enterprise or the enterprise itself. In some embodiments, aspects of the threat detection platform 100 are accessible or interactable via a web-accessible computer program operating on a computer server or a distributed computing system. For example, an individual may be able to interface with the threat detection platform 100 through a web browser that is executing on an electronic computing device (also called an "electronic device" or "computing device").

The enterprise network may be a mobile network, wired network, wireless network, or some other communication network maintained by the enterprise or an operator on behalf of the enterprise. As noted above, the enterprise may utilize a security service to examine events to discover potential security threats. For example, the enterprise may grant permission to the security service to monitor the enterprise network by examining emails (e.g., incoming emails or outgoing emails) and then addressing those emails that represent security threats. The threat detection platform 100 may be permitted to remediate the threats posed by those emails, or the threat detection platform 100 may be permitted to surface notifications regarding the threats posed by those emails. In some embodiments, the enterprise further grants permission to the security service to obtain data regarding other digital activities involving the enterprise (and, more specifically, employees of the enterprise) in order to build a profile that specifies communication patterns, behavioral traits, normal context of emails, normal content of emails, etc. For example, the threat detection platform 100 may identify the filters that have been created and/or destroyed by each employee to infer whether any significant variations in behavior have occurred. As another example, the threat detection platform 100 may examine the emails or messages received by a given employee to establish the characteristics of normal communications (and thus be able to identify abnormal communications). As another example, the threat detection platform 100 may examine sign-in activities to establish characteristics (e.g., in terms of location, time, frequency) that can then be used to establish whether a single sign-in activity is unusual or a combination of sign-in activities is unusual.

The threat detection platform 100 may manage one or more databases in which data can be stored. Examples of such data include enterprise data (e.g., email data, message data, sign-in data, access data, and mail filter data), remediation policies, communication patterns, behavioral traits, and the like. The data stored in the database(s) may be determined by the threat detection platform 100 (e.g., learned from data available on the enterprise network or available from the developer), provided by the enterprise, or retrieved from an external database (e.g., associated with LinkedIn®, Microsoft Office 365®, or Google Workspace™). The threat detection platform 100 may also store outputs produced by the various modules, including machine- and human-readable information regarding insights into threats and any remediation actions that were taken.

As shown in FIG. 1, the threat detection platform 100 may include a profile generator 102 that is responsible for generating one or more profiles for the enterprise. For example, the profile generator 102 may generate a separate profile for each account associated with an employee of the enterprise based on the sign-in data, message data, email data, or mail filter data. Additionally or alternatively, profiles may be generated for business groups, organizational groups, or the enterprise as a whole. Examining the data may enable the profile generator 102 to discover organizational information (e.g., employees, titles, and hierarchy), employee behavioral traits (e.g., based on historical emails, messages, and historical mail filters), normal content of incoming or outgoing emails, behavioral patterns (e.g., when each employee normally logs in), communication patterns (e.g., who each employee communicates with internally and externally, when each employee normally communicates), etc. This information can be populated into the profiles so that each profile can be used as a baseline for what constitutes normal activity by the corresponding account (or group of accounts).

A profile could include a number of behavioral traits associated with the corresponding account. The profile generator 102 may determine the behavioral traits based on the access data, sign-in data, message data, email data, mail filter data, and any other data that is obtained from the enterprise network, developer, or another source. For example, the email data may include information on the senders of past emails received by a given email account, content of those past emails, frequency of those past emails, temporal patterns of those past emails, topics of those past emails, geographical locations from which those past emails originated, formatting characteristics (e.g., usage of HTML, fonts, styles, etc.), and more. For the given email account, the profile generator 102 may attempt to build a profile that includes information regarding the other email accounts to which emails are commonly transmitted to or received from, normal content of incoming and outgoing emails, normal transmission times, normal transmission locations, and the like. Accordingly, the profile generator 102 may attempt to build a profile for each account that represents a model of normal behavior of the corresponding employee. As further discussed below, the profiles may be helpful in identifying digital activities (also called "events") that are unusual, and therefore may be indicative of a security threat.

The monitoring module 106 may be responsible for monitoring communications (e.g., messages and emails) handled by the enterprise network. These communications may include incoming emails (e.g., external and internal emails) received by accounts associated with employees of the enterprise, outgoing emails (e.g., external and internal emails) transmitted by those accounts, and messages exchanged between those accounts. In some embodiments, the monitoring module 106 is able to monitor incoming emails in near real time so that appropriate action can be taken if a malicious email is discovered. For example, if an incoming email is determined to be representative of a phishing attack (e.g., based on an output produced by the scoring module 108), the incoming email may be prevented from reaching its intended destination by the monitoring module 106 at least temporarily. The incoming email may be routed to a special mailbox such as a security box further described with respect to FIG. 2 for further processing. In some embodiments, the monitoring module 106 is able to monitor communications only upon the threat detection platform 100 being granted permission by the enterprise (and thus given access to the enterprise network or another source).

A security mailbox 116 may receive suspicious messages as identified by monitoring module 106 or otherwise identified, e.g., by a domain expert. Although a single security mailbox 116 is shown here, this is merely exemplary and not intended to be limiting. For example, a respective security mailbox may be provided for each attack type or group of attack types as further described with respect to FIG. 13. Examples of attacks include, but are not limited to: phishing, spam, social engineering, extortion, scam, reconnaissance, malware, and invoice/payment fraud.

The scoring module 108 may be responsible for examining digital activities to determine the likelihood that a security threat exists. For example, the scoring module may perform functions associated with single-event analyzer 340. For example, the scoring module 108 may examine each incoming email to determine how its characteristics compare to past emails sent by the sender or received by the recipient. In such a scenario, the scoring module 108 may determine whether characteristics such as timing, formatting, and location of origination (e.g., in terms of sender email address or geographical location) match a pattern of past emails that have been determined to be non-malicious. For example, the scoring module 108 may determine that an email is likely malicious if the sender email address (support-xyz@gmail.com) differs from an email address (John.Doe@CompanyABC.com) that is known to be associated with the alleged sender (John Doe). As another example, the scoring module 108 may determine that an account may be compromised if the account performs a sign-in activity that is impossible or improbable given its most recent sign-in activity. As another example, the scoring module 108 may determine that an account may be compromised if the account performs an access event that is impossible or improbable given its most recent access event.

The scoring module 108 can make use of heuristics, rules, neural networks, or other trained machine learning ("ML") algorithms that rely on decision trees (e.g., gradient-boosted decision trees), logistic regression, or linear regression. Accordingly, the scoring module 108 may produce discrete outputs or continuous outputs, such as a probability metric (e.g., specifying the likelihood that an incoming email is malicious), a binary output (e.g., malicious or not malicious), or a classification (e.g., specifying the type of malicious email).

As mentioned above, the scoring module 108 may also consider combinations of digital activities—across the same platform or different platforms—to determine whether a security threat exists. This may be done in a "rolling" manner, where each digital activity performed with a given account is compared against prior digital activities performed with the given account that have been identified as unusual to some degree. Moreover, each digital activity performed with the given account could be compared against prior digital activities performed with related accounts (e.g., corresponding to other platforms) that have been identified as unusual to some degree.

The analysis module 110 may be responsible for considering whether different combinations of digital activities are indicative of a security threat. For example, the scoring module may perform functions associated with secondary analyzer 350. For example, the analysis module 110 may determine, based on the scores produced by the scoring module 108, whether a digital activity is individually indicative of a security threat or collectively—with at least one other digital activity—indicative of a security threat. Assume, for example, that the scores produced by the scoring module 108 are representative of deviation values, indicating the degree to which each corresponding digital activity deviates from past digital activities performed on the same platform with that account. These deviation values can be supplied to the analysis module 110, and the analysis module 110 may input these deviation values into a rules-based engine, heuristics-based engine, or model that predicts the likelihood of a security threat.

The responder module 122 may interact with client 120 to provide information and interaction regarding threat analysis. The responder may be programmed to perform the disclosed techniques, which may include using information determined by the other modules/generators in the platform 100, to automatically interact by email, chat, or other messaging means with a client to provide information about threats such as phishing. The responder module 122 may integrate, e.g., via API, with third party end-user phishing reporting buttons, SIEM (security information and event management) or SOAR (security orchestration, automation and response) solutions, ticketing system workflows, or the like.

The remediation module 112 may perform one or more remediation actions in response to the analysis module 110 determining that an account may be compromised. The remediation action(s) may be based on the nature of the threat, the policies implemented by the enterprise, etc. These policies may be predefined or dynamically generated based on inference, analysis, or the data obtained by the threat detection platform 100 (e.g., from the enterprise network or developer). Examples of remediation actions include moving communications generated by a compromised account into a hidden folder (also referred to as a "quarantine folder") for further analysis, prohibiting a compromised account from accessing sensitive information, sending notifications (e.g., to the actual employee, enterprise, or member of the security service), resetting the password of the compromised account, ending all active sessions of the compromised account, and resetting connections with services/ databases accessible via the enterprise network. As further described with respect to FIG. 13, the disclosed techniques may facilitate remediation actions by helping to identify situations that would benefit from remediation.

The reporting module 114 may be responsible for reporting insights derived from the outputs that are produced by the scoring module 108 and rendering a user interface for the responder module 122. For example, the reporting module 114 may provide a summary of the threats discovered through analysis of the outputs produced by the scoring module 108 to an electronic device 120. As another example, the reporting module 114 may send replies to inquiries regarding a suspicious message. The electronic device 120 may be managed by the employee associated with the account under examination, an individual associated with the enterprise (e.g., a member of the IT department), or an individual associated with a security service. The reporting module 114 can surface insights into threats in a human-readable format for display on an interface accessible via the electronic device 120.

As shown in FIG. 1, the threat detection platform 100 may also include a training module 104 that operates to train the models employed by the other modules. For example, the training module 104 may train the models applied by the scoring module 108 to the sign-in data, message data, email data, or mail filter data by feeding training data into those models. The training data could include emails that have been labeled as malicious or non-malicious, policies related to attributes of emails (e.g., specifying that emails originating from certain domains should not be considered malicious), etc. The training data may be employee- or enterprise-specific so that the model(s) are able to perform personalized analysis. In some embodiments, the training data ingested by the model(s) includes emails that are known to be representative of malicious emails sent as part of an attack campaign. These emails may have been labeled as such during a training process, or these emails may have been labeled as such by other employees.

Moreover, the training module 104 may implement a retraining pipeline (or simply "pipeline") in order to protect against novel threats as further discussed below. At a high level, the pipeline may be representative of a series of steps that, when executed by the training module 104, cause the models employed by the scoring module 108 to be retrained. By consistently training the models using up-to-date information, the threat detection platform 100 can protect against novel threats that would otherwise escape detection.

FIG. 2 is a flow diagram illustrating an embodiment of a process for automatic security message interaction. This process may be implemented on or by the security threat detection system of FIG. 1 or the processor 14 of FIG. 14.

In the example shown, the process begins by receiving an indication of a suspicious message (200). A suspicious message is any message, file, or other content judged to be of possible security risk. The determination may be made automatically by a human, or a combination thereof. As further described in FIG. 1, the monitoring module 106 may monitor messages and use various technologies to determine whether a message is suspicious. As another example, the suspicious message may be reported by a user, individual, or other reporter. The reporting may be made by sending an email, starting a ticket, among others. Suspicious messages may be collected in one or more places. For example, a security mailbox 116 receives and stores suspicious messages.

The process uses one or more threat analysis machine learning models to analyze the suspicious message to determine a threat analysis result of the suspicious message (202). The threat analysis result may include a threat analysis score, which is a quantification of how likely the suspicious message is a security risk. The determined threat analysis result may be stored and used to determine remediation actions as further described herein. For example, the threat analysis result includes an assessment of a likelihood that the suspicious message is part of a phishing attack.

In various embodiments, the suspicious message or a characteristic of the suspicious message is provided to the one or more threat analysis machine learning models to determine the threat analysis result.

The one or more threat analysis machine learning models used to analyze the suspicious message may be used in a tiered fashion. For example, a first-level model group of models that are computationally less expensive may be used prior to moving to a second-level model group of models, etc. A benefit of using the tiered models is that existing computational resources are used more efficiently, or there may be a reduction in the computational resources used while providing effective results. An example of a tiered approach is further described with respect to FIG. 4.

Based at least in part on a result of the threat analysis result, security policies of an entity, and a communication preference of the entity, the process automatically generates a prompt for a machine learning large-language model to generate a responsive message communicating about the suspicious message (204).

In various embodiments, the responsive message includes a list of reasons associated with the threat analysis result and/or the security policies of the entity. A responsive message communicating about the suspicious message may include an explanation of the threat analysis result of the suspicious message. As further described herein, the content of the responsive message may take into consideration the preferences of the entity. For example, a responsive message that simply states that the suspicious message is malicious may be generated for an entity that prefers a straightforward response or has a stricter security policy. As another example, a responsive message that lists signals that indicate the suspicious message is malicious along with signals that indicate the suspicious message is benign may be generated for an entity that prefers a more nuanced approach or has a more lenient security policy. The responsive message may also take into consideration a recipient or the recipient's level of expertise. For example, a responsive message that includes a list of reasons why a message is malicious or benign may be more appropriate for a more experienced security expert compared with a trainee security expert.

The entity may be an enterprise, a user, sub-group of an enterprise, group of users, etc. The security policies and communication preferences are examples of preferences of the entity that may be taken into account by the machine learning large-language model to generate the responsive message.

For example, the communication preference is associated with a tone of the responsive message, such as to be funny or serious. An example of how the communication preference can be indicated is at 1016 of FIG. 10 where an administrator provides instructions that the broader employee base should receive communications in an official but friendly tone or voice. The responsive message may be delivered in a variety of ways, such as via a written message or an audio message that adopts a tone or voice in accordance with the communication preference. The security policy, communication preference, among other things, may be captured by a custom instruction set. An example responsive message is: "Hey, your email was judged as safe, it was judged as safe because A, B, C, you might've thought it was a phishing attack because of X, Y, Z, but remember our phishing policy says to trust J, K, L." The list of reasons may correspond to the features with which a large-language model is trained. For example, if a feature is domain age, then this would be a reason why a message is considered safe or not safe.

One or more of the communication preferences may include information about an organization and communicated via the responsive message. For example, users may be recommended to use a password with a certain number of characters or specific combinations or alphanumeric characters. This also provides an opportunity to train users in accordance with the preferences and policies of the organization.

In various embodiments, generating the responsive message includes removing content from the responsive message associated with attempted misuse of at least one of: the one or more threat analysis machine learning models or the machine learning large-language model. Attempted misuse of the machine learning models may include answering irrelevant questions/topics or finding information related to sensitive or security issues (e.g., related to a user). For example, if an indication of the suspicious message includes a question of "how to make pancake," or "did any other VIP get this message," the process may filter out these questions so that they are not input to the machine learning models. Alternatively, any content that is generated related to attempted misuse may be removed prior to sending the responsive message. Attempted misuse may be identified in a variety of ways, such as by using a look-up table or learning (e.g., via a machine learning model) to identify attempted misuse via appropriate training data.

The process provides the generated responsive message to a recipient of the suspicious message (206). For example, an email or chat may be sent to a user (e.g., reporter) so that they are aware of the security risk, if any. For example, the responsive message includes a judgment of whether the message was part of an attack, spam, or safe. An example of a responsive message is further described with respect to FIG. 5.

The suspicious message and/or the responsive message may be provided within any suitable communication client such as an email client or a chat client. For example, the messages may be chats or emails. A mixture of communications media may be used. For example, the conversation may begin as an email and continue in a chat or vice versa.

In various embodiments, further interaction may be provided based on the responsive message. For example, a user may ask clarifying questions, similar to how a service ticket may remain open and include several iterations or replies and responses prior to resolution and closing the ticket or conversation. The following figure shows an example of a process for continuing a conversation.

FIG. 3 is a flow diagram illustrating an embodiment of a process for automatic security message interaction including generating a responsive message to a reply message. This process may be implemented on or by the security threat detection system of FIG. 1 or the processor 1402 of FIG. 14. This process may be performed as part of or in conjunction with another process such as after 206 of FIG. 2.

In the example shown, the process begins by receiving a reply message from the recipient in response to the generated responsive message (300). The reply message may include any content including questions a user may ask a traditional domain expert such as:

Do you know the sender?

Who is the sender?

Why was this judged as phishing?

I am unfamiliar with this domain, but I think it's suspicious.

In various embodiments, the reply message is used to train at least one of: the one or more threat analysis machine learning models or the machine learning large-language model.

Based at least in part on the reply message and the generated responsive message, the process automatically generates a second prompt for the machine learning large-language model to generate a second responsive message to answer the reply message from the recipient (302).

The process provides the generated second responsive message to the recipient of the suspicious message (304). In response to a reply message asking why an email is judged as phishing, the second responsive message may include a list of reasons and what to look out for in the future.

An example exchange may be as follows:

User: Somebody sent me a strange social media request

Autoresponder: Do you know who the sender is?

User: I don't recall the name of the user

Autoresponder: Do not click on the link.

Conventional techniques typically support a conversation prior to providing a determination of whether a message is suspicious. The ability to have a conversation may tease out aspects of a message, enabling a better judgment of the security nature of the message as well as training opportunities to educate the user on the reason for why a message is or is not malicious.

In various embodiments, over time, with the addition of training data, reply messages may be anticipated. For example, if a particular type of reply message is frequently seen, then content that would be provided in the second responsive message may be provided in the first responsive message. In other words, frequently asked questions may be anticipated and addressed initially to further reduce computational costs by reducing the instances of performing the process of FIG. 3.

FIG. 4 is a flow diagram illustrating an embodiment of a process for automatic security message interaction including using a threat analysis machine learning model to analyze a suspicious message. This process may be implemented on or by the security threat detection system of FIG. 1 or the processor 1402 of FIG. 14. This process may be performed as part of another process such as 202 of FIG. 2.

In the example shown, the process begins by determining a first-level model group of one or more machine learning models for analyzing the suspicious message, wherein the first-level model group of one or more machine learning models is determined to incur a computational cost below a cost threshold (400).

An example of a machine learning model that is determined to incur a computational cost below a cost threshold is a generic machine learning model (rather than a large-language model). However, this is merely exemplary and not intended to be limiting as there may exist some large-language models that are relatively lightweight compared with other large-language models.

Some of the machine learning models selected for inclusion in the first-level model group of one or more machine learning models may have been previously used to initially identify a message to be suspicious. However, the set of models used for the initial determination that the message is a suspicious message may be different from the set of models selected at this step. For example, an objective of the initial set of models may be to identify why a message is suspicious/malicious while 400 may concern an opposite objective such as identifying why a message is safe. Therefore, detection thresholds may be adjusted to meet various objectives.

In other words, in various embodiments, determining the first-level model group of one or more machine learning models for analyzing the suspicious message includes determining at least a detection threshold for the first-level model group of one or more machine learning models.

The detection threshold may be set to be more lenient or sensitive depending upon the type of model and desired behavior. For example, if a model is trying to catch an attack, the model can be tuned to be less sensitive because there is a relatively higher chance that this is an attack. On the other hand, if a model is trying to identify a safe message, the model can be tuned to be more sensitive.

The process uses the first-level model group to determine a first threat score and a first confidence score associated with the suspicious message (402). Various models or detectors may be used. By way of a non-limiting example, models may be tuned for various purposes such as: a spam model to detect spam, an ensemble model, and a critic model that evaluates an overall structure. The reasons or explanations for identifying a message as malicious may be determined from the particular model results.

In various embodiments, the final decision regarding the message is saved without saving component scores. This may be more memory-efficient while providing good results. Alternatively, at least a portion of the component scores may be saved.

The process determines whether the first threat score exceeds a first threat threshold and the first confidence score exceeds a first confidence threshold (404). If not, the process ends. Not being sufficiently confident and/or not exceeding the first threat threshold indicates that the message is likely not malicious. The message may be deemed safe and the process ends without running further machine learning models. A corresponding output may be provided.

Otherwise, the process proceeds to 406 to use a second-level model group of one or more machine learning models to determine a second threat score and a second confidence score associated with the suspicious message. The second-level model group may include one or more large-language models used to further evaluate the message because the first-level model group is unable to form a confident judgment of the nature of the message.

In various embodiments, machine learning features for the second-level model group includes at least one of: domain age, unknown sender, or a DomainKeys Identified Mail (DKIM) specification. The domain age refers to how old a domain is, which may be proxy for or factor in the trustworthiness of the domain. Typically, older domains are likely safer domains. Unlike other machine learning models, a large-language model may produce an explanation for a prediction. In other words, the large-language model may provide explainability for associated machine learning models. This may be helpful in a conversation between a user and an autoresponder. The large-language model may be prompted with the message and/or characteristics of the message such as the domain age. The model may output a second threat score that indicates the level of suspiciousness along with a second confidence score indicating the model's level of confidence in its determination.

The process determines whether the second threat score exceeds a second threat threshold and the second confidence score exceeds a second confidence threshold (408). If not, the process ends. Similar to 404, the message may be deemed safe and the process ends without running further machine learning models. A corresponding output may be provided.

Otherwise, the process proceeds to 410 to obtain a domain expert determination of a threat analysis score. The domain expert may be provided with the output of the second-level model group and an explanation to determine the threat analysis score, which indicates whether the suspicious message is malicious.

FIG. 5 shows an example of a graphical user interface for automatic security message interaction including a responsive message obtained in some embodiments. This user interface shows a responsive message communicating about the suspicious message generated by a process such as the one generated at 204 of FIG. 2. This example responsive message includes a judgment that the suspicious message is safe and gives reasons for the determination (indicated by the dashed underline). In accordance with the company's training policies, the user is thanked for being vigilant and encouraged to continue reporting suspicious emails.

FIG. 6 shows an example of a graphical user interface for automatic security message interaction including a reply message and a second responsive message obtained in some embodiments. This user interface shows an example of a reply message 602 from a recipient such as the one received at 300 of FIG. 3 along with a second responsive message 604 such as the one generated by a process such as the one generated at 302.

The disclosed techniques may be implemented in the context of a security threat detection platform as described with respect to FIG. 1. The following figures show examples of graphical user interfaces associated with a security threat platform that supports configuration of automatic security message interaction.

Figure 7:
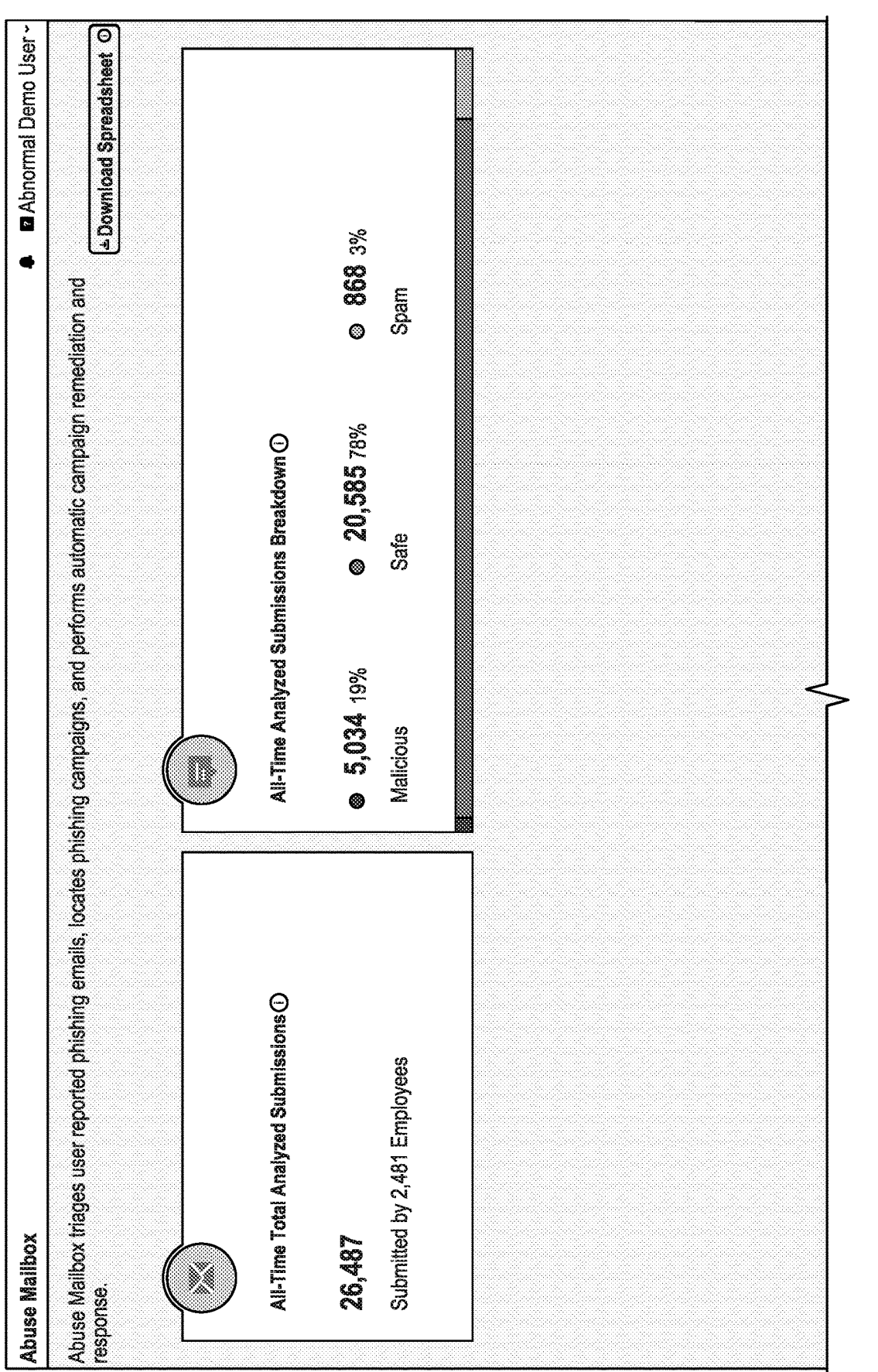
FIG. 7 shows an example of a graphical user interface for a security mailbox obtained in some embodiments.

FIG. 7 shows an example of a graphical user interface for a security mailbox obtained in some embodiments. More specifically, this user interface may be used to interact with a security mailbox such as mailbox 116 of FIG. 1. Here, the security mailbox is "abuse mailbox," with the messages being shown in the bottom of the screen as "analyzed submissions." The submissions may be analyzed by a conversationalist such as the one disclosed herein.

In various embodiments, this user interface as well as those shown in FIGS. 8-13 may be associated with a dashboard for a security threat detection platform including automatic security message interaction functionality such as the platform 100 of FIG. 1.

Figure 8:
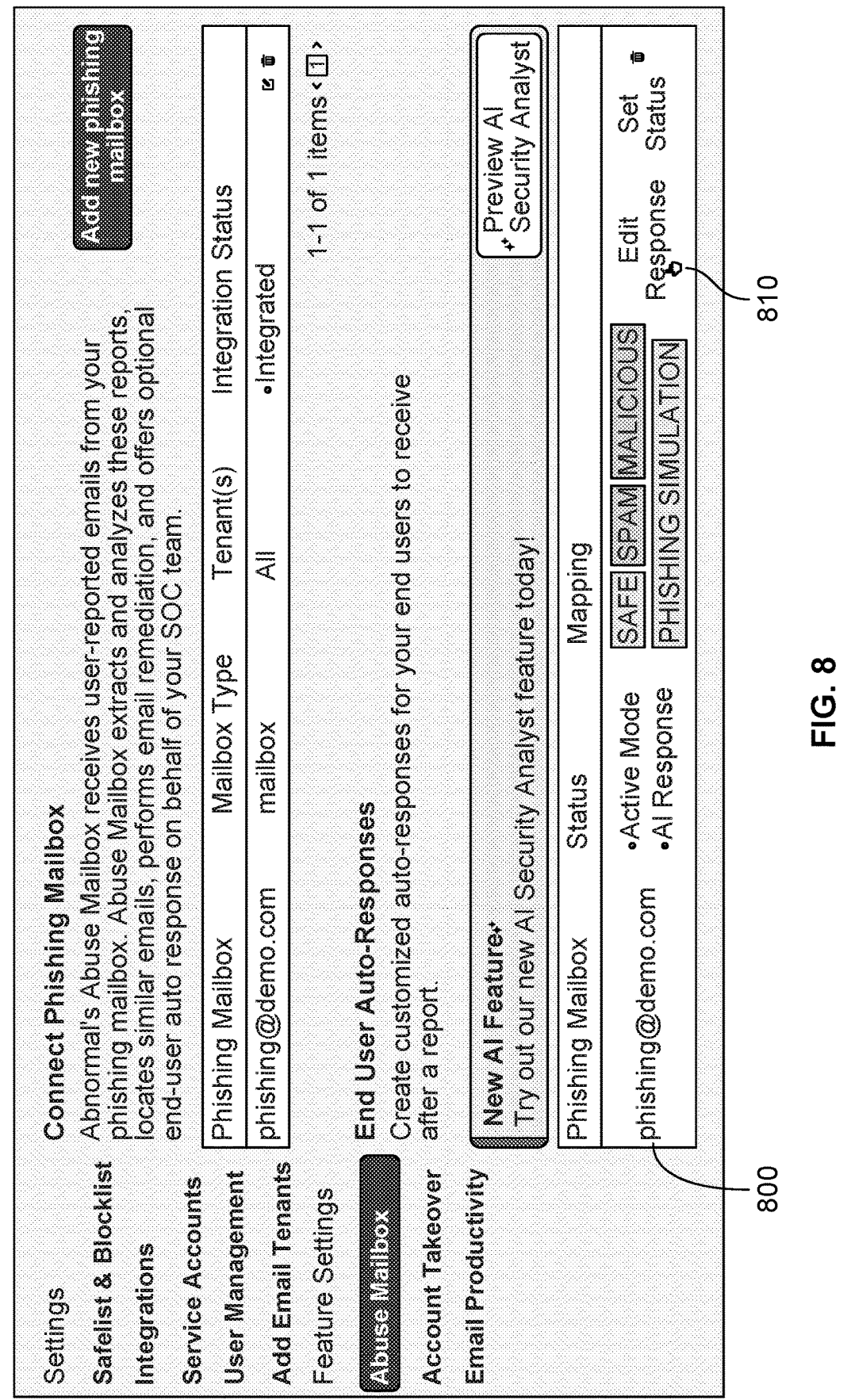
FIG. 8 shows an example of a graphical user interface for configuring automatic security message interaction obtained in some embodiments.

FIG. 8 shows an example of a graphical user interface for configuring automatic security message interaction obtained in some embodiments. In this example, one or more phishing mailboxes may be displayed. In this example, there is one security mailbox, phishing@demo.com 800, whose attributes (e.g. status) are displayed and that can be further configured. Selecting 810 causes a user interface such as the one shown in FIG. 9 to be displayed.

FIG. 9 shows an example of a graphical user interface for configuring automatic security message interaction for a particular security mailbox obtained in some embodiments. This form may be filled out, e.g., by an administrator, to define how responses are created.

Figure 10:
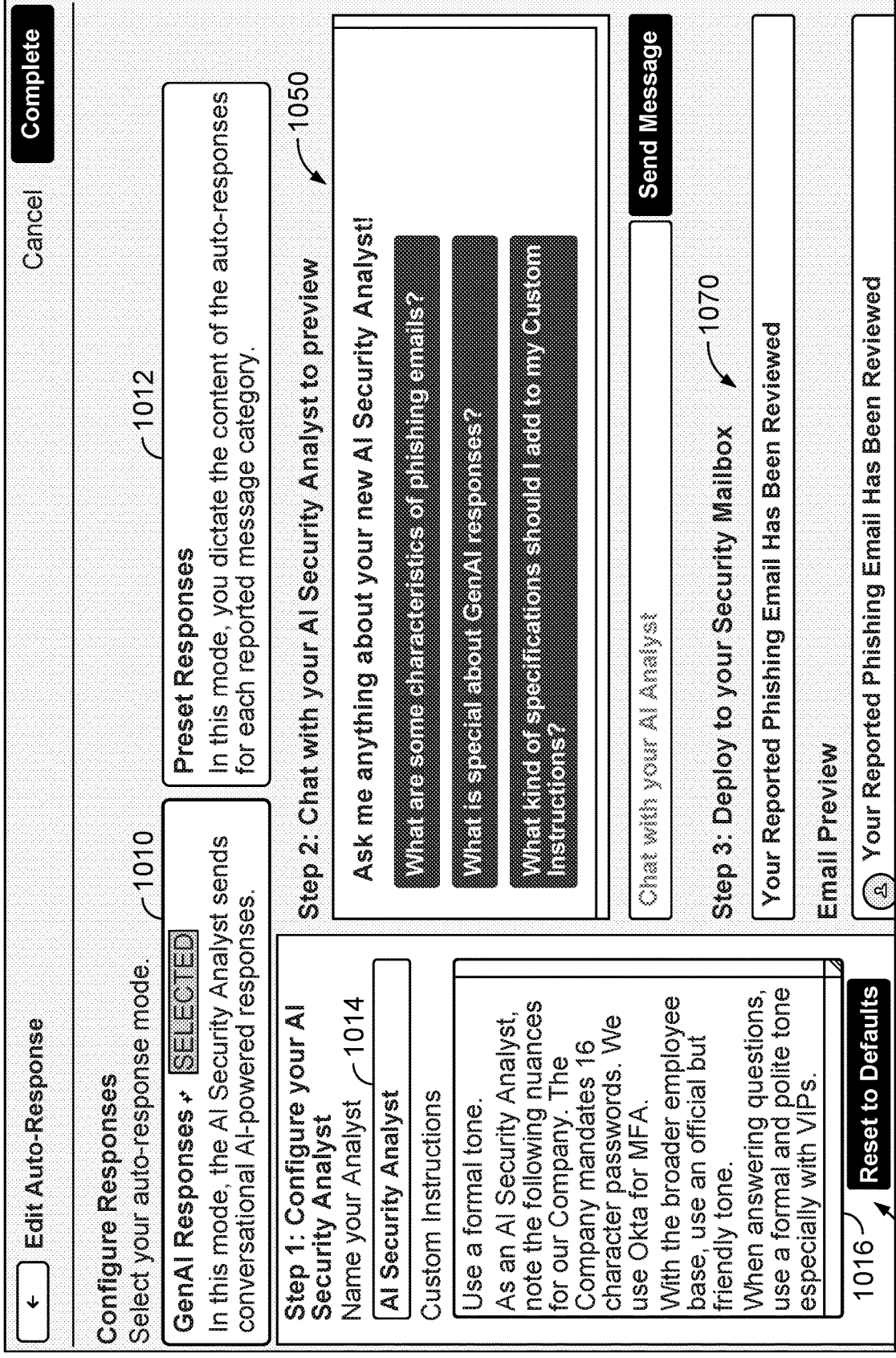
FIG. 10 shows an example of a graphical user interface for configuring automatic security message interaction for a particular security mailbox obtained in some embodiments.

FIG. 10 shows an example of a graphical user interface for configuring automatic security message interaction for a particular security mailbox obtained in some embodiments. Selection may be offered between various modes such as preset responses 1012 or generative artificial intelligence responses 1010. The mode may cause the disclosed techniques to be performed to send conversational responses, at least some of which may be generated according to the disclosed techniques.

Section 1020 accepts user input such as a name for the analyst 1014 (which may correspond to a responder such as responder module 122 of FIG. 1) and instructions 1016. The instructions may be a custom instruction set or may include selectable options.

Section 1050 provides a preview of an interaction with the analyst 1014. The interaction may be in the form of emails, chats, or the like. The interaction may include questions related to configuration of the analyst, security mailbox, among other things.

Section 1070 provides a preview of responsive messages such as the one shown in FIG. 5.

Figure 11A:
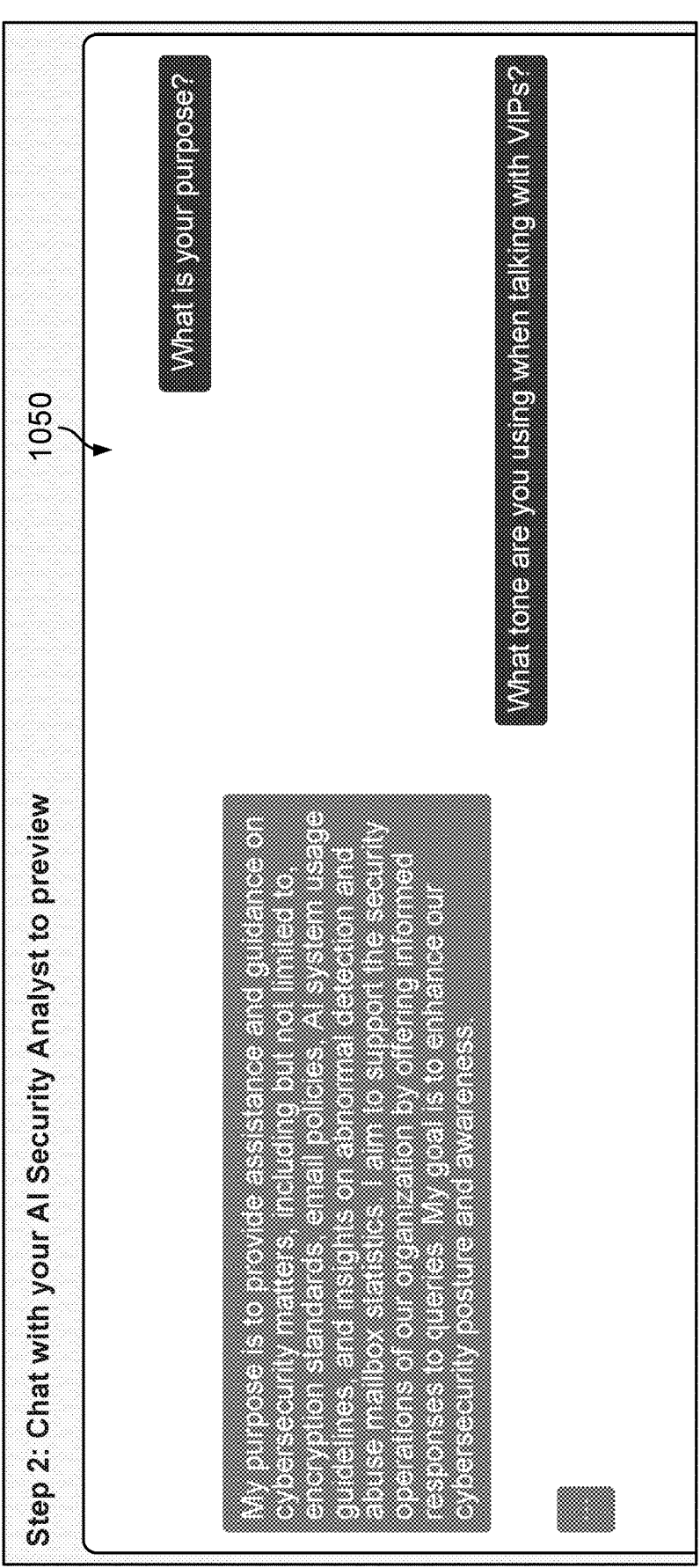
FIG. 11A shows an example of a graphical user interface for a preview of an interaction with a security analyst obtained in some embodiments.

FIG. 11A shows an example of a graphical user interface for a preview of an interaction with a security analyst obtained in some embodiments.

Figures 11B, 11C:
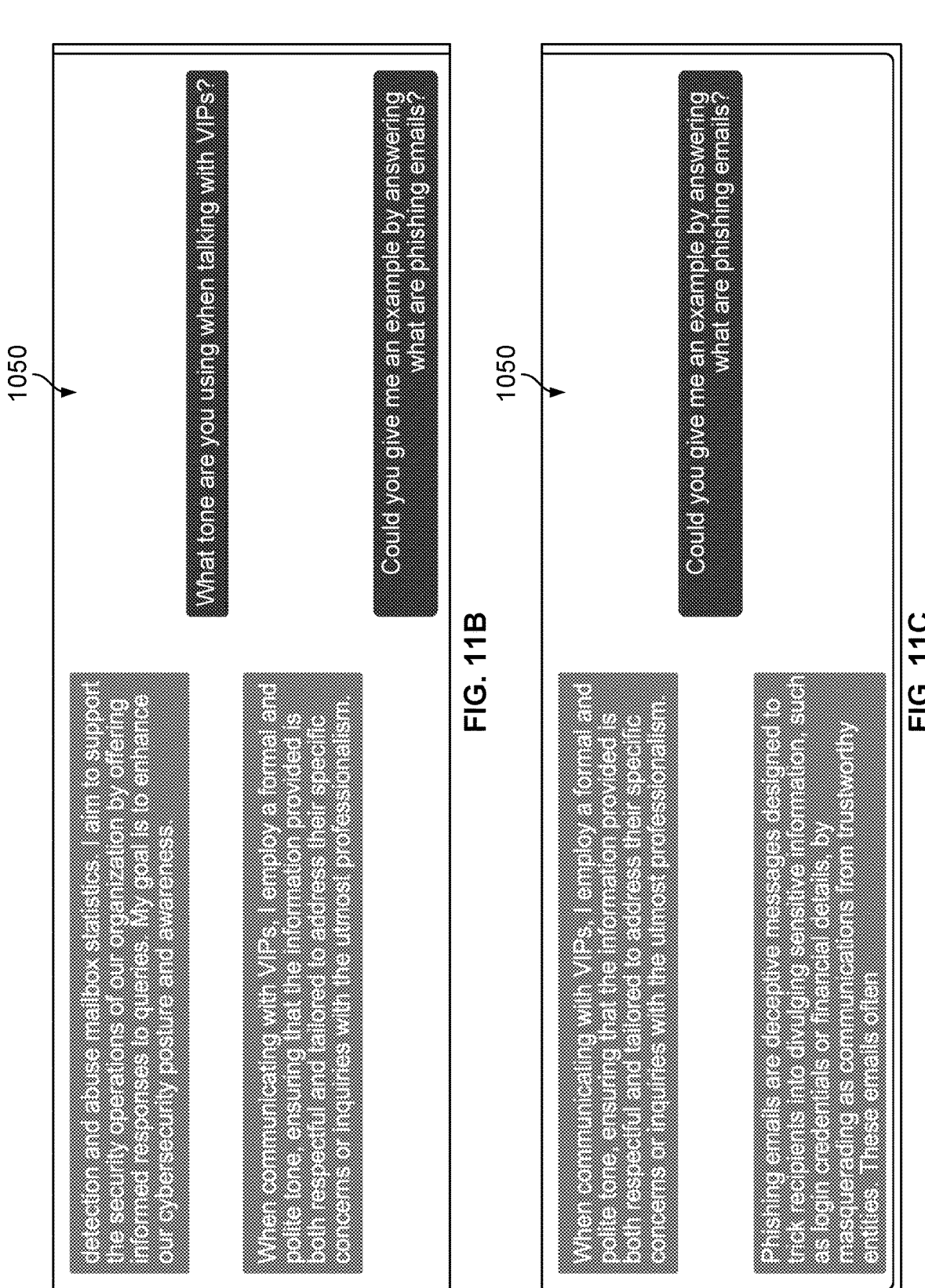
FIG. 11B shows another example of a graphical user interface for a preview of an interaction with a security analyst obtained in some embodiments.
FIG. 11C shows another example of a graphical user interface for a preview of an interaction with a security analyst obtained in some embodiments.

FIG. 11B shows another example of a graphical user interface for a preview of an interaction with a security analyst obtained in some embodiments.

FIG. 11C shows another example of a graphical user interface for a preview of an interaction with a security analyst obtained in some embodiments.

Figure 12:
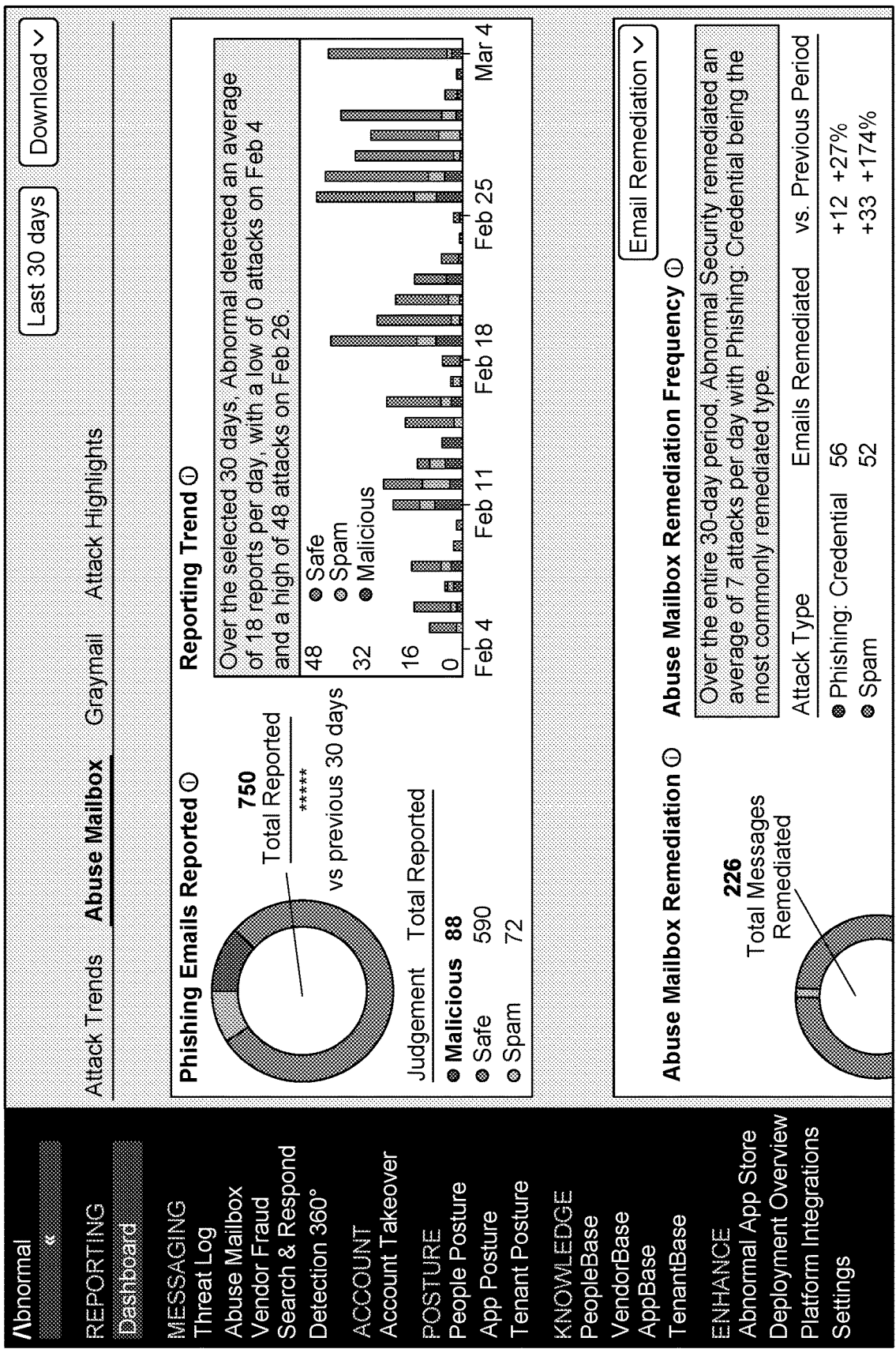
FIG. 12 shows an example of a graphical user interface for a dashboard for a security threat detection platform including automatic security message interaction function-ality.

FIG. 12 shows an example of a graphical user interface for a dashboard for a security threat detection platform including automatic security message interaction functionality.

FIG. 13 shows an example of a graphical user interface for a dashboard for a security threat detection platform including automatic security message interaction functionality. This user interface shows a number of cases remediated using an abuse mailbox (an example of which is security mailbox 116 of FIG. 1). As shown, the disclosed techniques may improve the technical field of security analysis by being able to efficiently process potential security threats. Here, 222 messages are remediated via a security mailbox with the aid of the disclosed automatic security message interaction techniques. The table on the right side shows several attack types. In various embodiments, each attack type (or a group of attack types) may be handled by a respective security mailbox.

Although described for the case of identifying security vulnerabilities, the disclosed techniques may be applied to provide conversations related to other decisions such as whether or not to send an email message.

Figure 14:
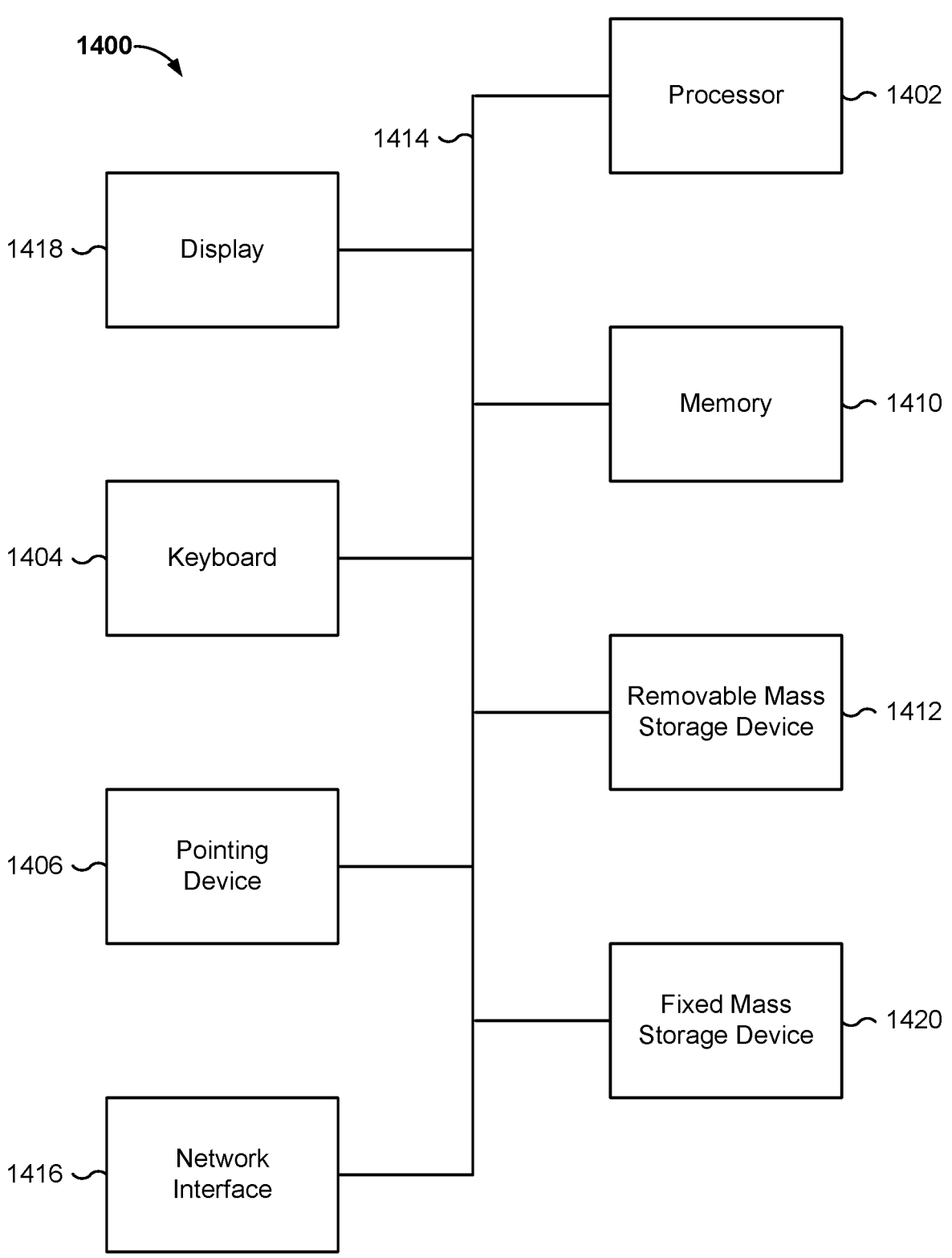
FIG. 14 is a functional diagram illustrating a programmed computer system for automatic security message interaction in accordance with some embodiments.

FIG. 14 is a functional diagram illustrating a programmed computer system for automatic security message interaction in accordance with some embodiments. As will be apparent, other computer system architectures and configurations can be used to provide automatic security message interaction. Computer system 1400, which includes various subsystems as described below, includes at least one microprocessor subsystem (also referred to as a processor or a central processing unit (CPU)) 1402. For example, processor 1402 can be implemented by a single-chip processor or by multiple processors. In some embodiments, processor 1402 is a general purpose digital processor that controls the operation of the computer system 1400. Using instructions retrieved from memory 1410, the processor 1402 controls the reception and manipulation of input data, and the output and display of data on output devices (e.g., display 1418). In some embodiments, processor 1402 includes and/or is used to provide a threat detection platform such as platform 100 described herein with respect to FIG. 1 and/or executes/performs the processes described herein with respect to FIGS. 2-4.

Processor 1402 is coupled bi-directionally with memory 1410, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1402. Also as is well known in the art, primary storage typically includes basic operating instructions, program code, data and objects used by the processor 1402 to perform its functions (e.g., programmed instructions). For example, memory 1410 can include any suitable computer-readable storage media, described below, depending on whether, for example, data access needs to be bi-directional or uni-directional. For example, processor 1402 can also directly and very rapidly retrieve and store frequently needed data in a cache memory (not shown).

A removable mass storage device 1412 provides additional data storage capacity for the computer system 1400, and is coupled either bi-directionally (read/write) or uni-directionally (read only) to processor 1402. For example, storage 1412 can also include computer-readable media such as magnetic tape, flash memory, PC-CARDS, portable mass storage devices, holographic storage devices, and other storage devices. A fixed mass storage 1420 can also, for example, provide additional data storage capacity. The most common example of mass storage 1420 is a hard disk drive. Mass storage 1412, 1420 generally store additional programming instructions, data, and the like that typically are not in active use by the processor 1402. It will be appreciated that the information retained within mass storage 1412 and 1420 can be incorporated, if needed, in standard fashion as part of memory 1410 (e.g., RAM) as virtual memory.

In addition to providing processor 1402 access to storage subsystems, bus 1414 can also be used to provide access to other subsystems and devices. As shown, these can include a display monitor 1418, a network interface 1416, a keyboard 1404, and a pointing device 1406, as well as an auxiliary input/output device interface, a sound card, speakers, and other subsystems as needed. For example, the pointing device 1406 can be a mouse, stylus, track ball, or tablet, and is useful for interacting with a graphical user interface.

The network interface 1416 allows processor 1402 to be coupled to another computer, computer network, or telecommunications network using a network connection as shown. For example, through the network interface 1416, the processor 1402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1402 can be used to connect the computer system 1400 to an external network and transfer data according to standard protocols. For example, various process embodiments disclosed herein can be executed on processor 1402, or can be performed across a network such as the Internet, intranet networks, or local area networks, in conjunction with a remote processor that shares a portion of the processing. Additional mass storage devices (not shown) can also be connected to processor 1402 through network interface 1416.

An auxiliary I/O device interface (not shown) can be used in conjunction with computer system 1400. The auxiliary I/O device interface can include general and customized interfaces that allow the processor 1402 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 14 is but an example of a computer system suitable for use with the various embodiments disclosed herein. Other computer systems suitable for such use can include additional or fewer subsystems. In addition, bus 1414 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving an indication of a suspicious message;

analyzing the suspicious message using one or more threat analysis machine learning models to determine a threat analysis result of the suspicious message;

based at least in part on a result of the threat analysis result, security policies of an entity, and a communication preference of the entity, automatically generating a prompt for a machine learning large-language model to generate a responsive message communicating about the suspicious message, wherein generating the responsive message includes removing content from the responsive message associated with attempted misuse of at least one of: the one or more threat analysis machine learning models or the machine learning large-language model; and providing the generated responsive message to a recipient of the suspicious message.

2. The method of claim 1, further comprising:

receiving a reply message from the recipient in response to the generated responsive message;

based at least in part on the reply message and the generated responsive message, automatically generating a second prompt for the machine learning large-language model to generate a second responsive message to answer the reply message from the recipient; and providing the generated second responsive message to the recipient of the suspicious message.

3. The method of claim 1, wherein the threat analysis result includes an assessment of a likelihood that the suspicious message is part of a phishing attack.

4. The method of claim 1, wherein using the one or more threat analysis machine learning models to analyze the suspicious message to determine the threat analysis result of the suspicious message includes providing at least one of: the suspicious message or a characteristic of the suspicious message to the one or more threat analysis machine learning models.

5. The method of claim 1, wherein using the one or more threat analysis machine learning models to analyze the suspicious message includes:

determining a first-level model group of one or more machine learning models for analyzing the suspicious message, wherein the first-level model group of the one or more machine learning models is determined to incur a computational cost below a cost threshold;

using the first-level model group to determine a first threat score and a first confidence score associated with the suspicious message;

in response to the first threat score exceeding a first threat threshold and the first confidence score exceeding a first confidence threshold, using a second-level model group of the one or more machine learning models to determine a second threat score and a second confidence score associated with the suspicious message; and in response to the second threat score exceeding a second threat threshold and the second confidence score exceeding a second confidence threshold, obtaining a domain expert determination of a threat analysis score.

6. The method of claim 5, wherein determining the first-level model group of the one or more machine learning models for analyzing the suspicious message includes determining at least a detection threshold for the first-level model group of the one or more machine learning models.

7. The method of claim 5, wherein machine learning features for the second-level model group includes at least one of: domain age, unknown sender, or a DomainKeys Identified Mail (DKIM) specification.

8. The method of claim 2, wherein the reply message is used to train at least one of: the one or more threat analysis machine learning models or the machine learning large-language model.

9. The method of claim 1, wherein the suspicious message or the generated responsive message includes an email.

10. The method of claim 1, wherein the suspicious message or the generated responsive message is provided within an email client.

11. The method of claim 1, wherein the suspicious message or the generated responsive message is provided within a chat client.

12. The method of claim 1, wherein the communication preference is associated with a tone of the generated responsive message.

13. The method of claim 12, wherein the tone of the responsive message is at least one of: formal or casual.

14. The method of claim 1, wherein the generated responsive message includes at least one of: a list of reasons associated with the threat analysis result or the security policies of the entity.

15. The method of claim 1, wherein the responsive message includes information about an organization.

16. The method of claim 1, wherein the communication preference is configurable by a user.

17. The method of claim 1, further comprising determining the attempted misuse of at least one of: the one or more threat analysis machine learning models or the machine learning large-language model based at least in part on at least one of: an irrelevant topic or finding sensitive information related to a user.

18. A system, comprising:
a processor; and
a memory coupled to the processor and configured to provide the processor with instructions that, when executed by the processor, causes the processor to:
receive an indication of a suspicious message;
analyze the suspicious message using one or more threat analysis machine learning models to determine a threat analysis result of the suspicious message;
based at least in part on a result of the threat analysis result, security policies of an entity, and a communication preference of the entity, automatically generate a prompt for a machine learning large-language model to generate a responsive message communicating about the suspicious message, wherein generating the responsive message includes removing content from the responsive message associated with attempted misuse of at least one of: the one or more threat analysis machine learning models or the machine learning large-language model; and
provide the generated responsive message to a recipient of the suspicious message.

19. A computer program product embodied in a non-transitory computer readable medium and comprising computer instructions for:
receiving an indication of a suspicious message;
analyzing the suspicious message using one or more threat analysis machine learning models to determine a threat analysis result of the suspicious message;
based at least in part on a result of the threat analysis result, security policies of an entity, and a communication preference of the entity, automatically generating a prompt for a machine learning large-language model to generate a responsive message communicating about the suspicious message, wherein generating the responsive message includes removing content from the responsive message associated with attempted misuse of at least one of: the one or more threat analysis machine learning models or the machine learning large-language model; and
providing the generated responsive message to a recipient of the suspicious message.

* * * * *